United States Patent [19]

Sirman et al.

[11] Patent Number: 5,023,596

[45] Date of Patent: Jun. 11, 1991

[54] BICYCLE ALARM

[75] Inventors: James B. Sirman, Surbiton; Ivan F. S. Foti, Hounslow, both of England

[73] Assignee: Datatool Alarms Limited, London, England

[21] Appl. No.: 469,388

[22] Filed: Jan. 24, 1990

[30] Foreign Application Priority Data

Oct. 13, 1989 [GB] United Kingdom ............... 8923105

[51] Int. Cl.$^5$ ............................................ G08B 13/14
[52] U.S. Cl. ..................................... 340/571; 70/233
[58] Field of Search .................... 340/571; 70/233, 30, 70/49; 292/320

[56] References Cited

U.S. PATENT DOCUMENTS

| | | | |
|---|---|---|---|
| 3,755,778 | 8/1973 | Kennedy | 340/571 |
| 3,772,645 | 11/1973 | Odenz et al. | 340/571 |
| 3,910,081 | 10/1975 | Pender | 70/233 |
| 4,833,456 | 5/1989 | Heller | 340/571 |

FOREIGN PATENT DOCUMENTS 2148248 5/1985 United Kingdom ............... 340/571

Primary Examiner—Reinhard J. Eisenzopf
Assistant Examiner—Geoff Sutcliffe
Attorney, Agent, or Firm—Lee, Mann, Smith, McWilliams & Sweeney

[57] ABSTRACT

An alarm lock particularly suitable for use with a bicycle or similar article to be secured, comprising a casing having an integral clamping device and containing an alarm siren which can be actuated either by an internal motion sensitive device, or by breaking or disconnecting a security loop which is connected around the article. Both of the alarm devices are connected to an automatically resettable detector circuit which includes a timer for resetting after a predetermined period. A battery for the circuit is contained in a compartment which is closed by abutment of the alarm lock against the body of the article, when it is attached by the integral clamping device.

9 Claims, 4 Drawing Sheets

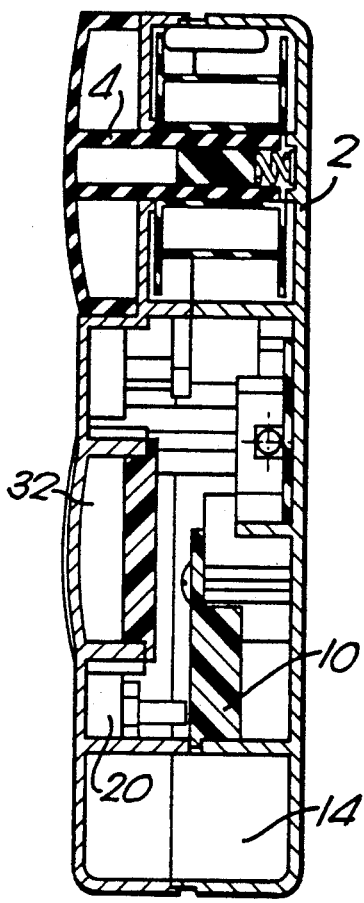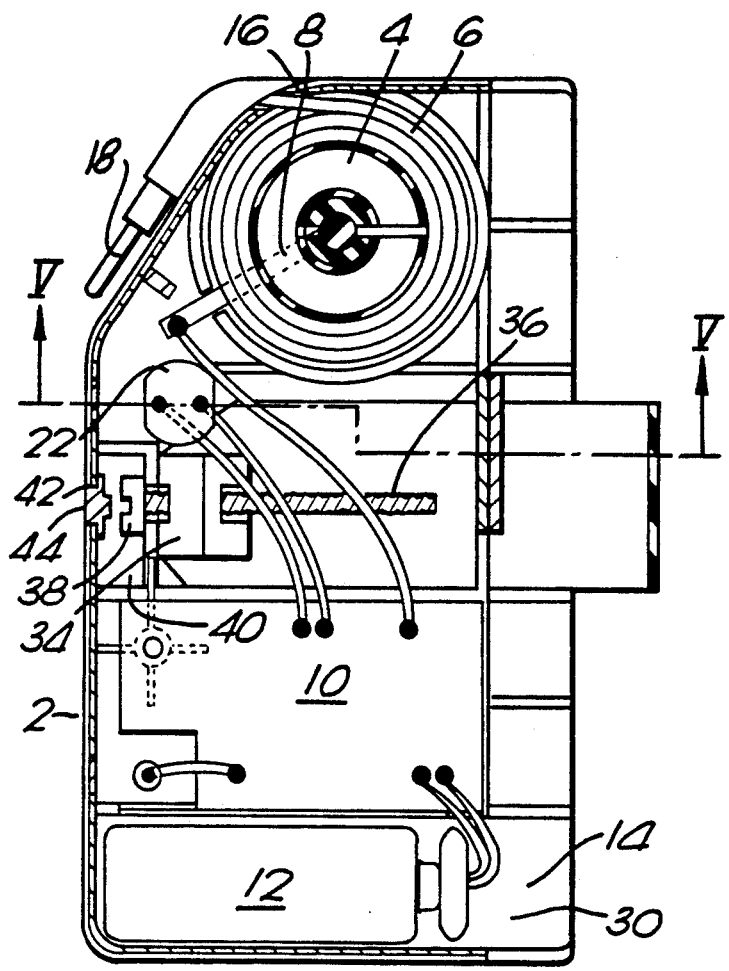
FIG._1.    FIG._2.
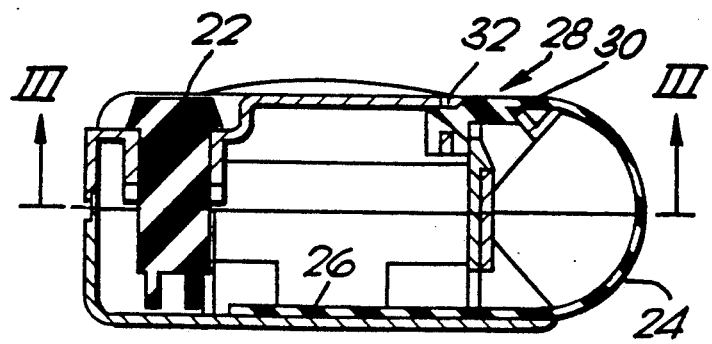
FIG._5.

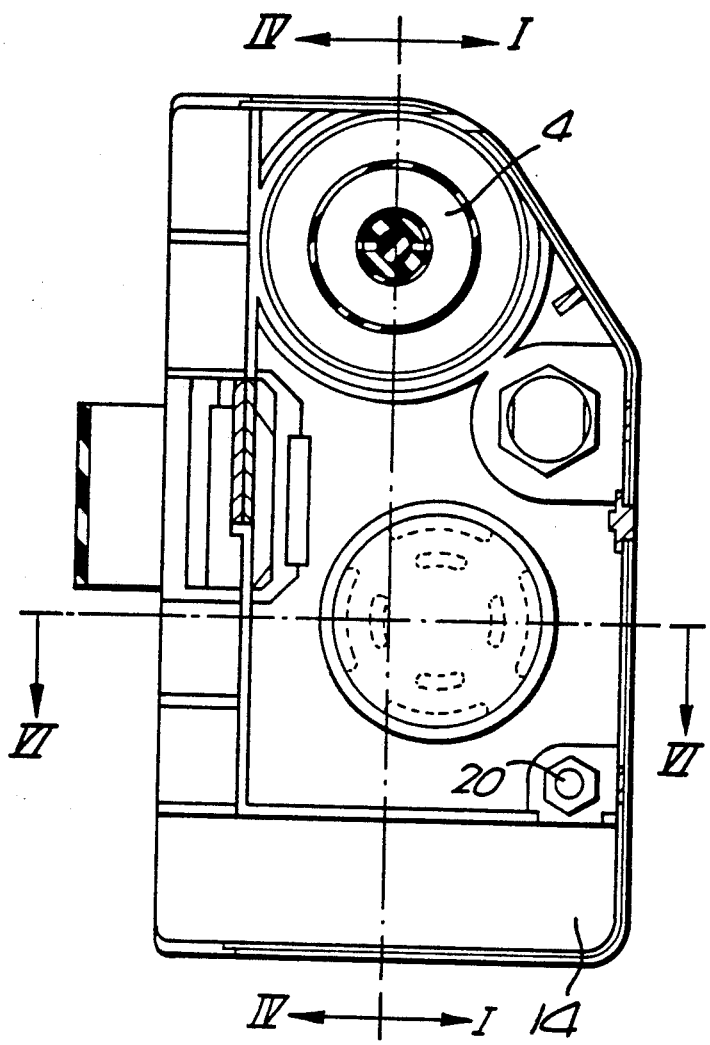
FIG._3.
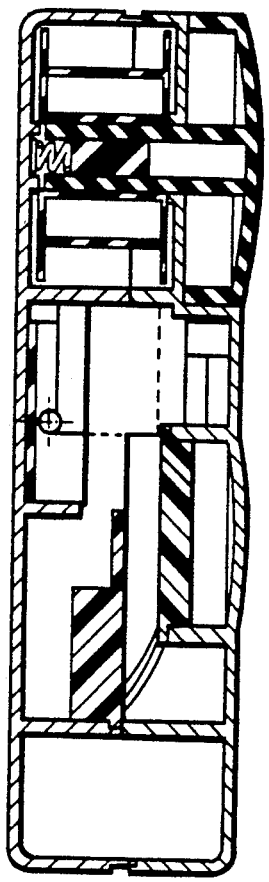
FIG._4.
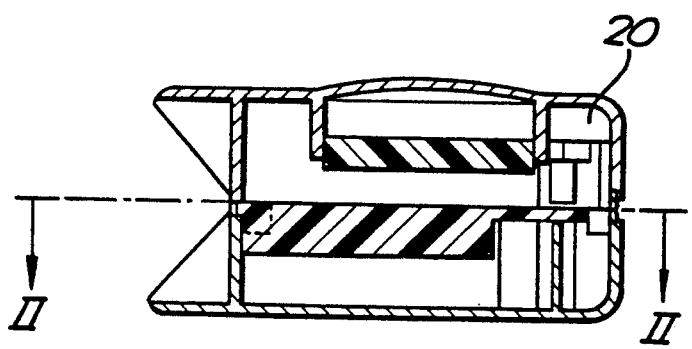
FIG._6.

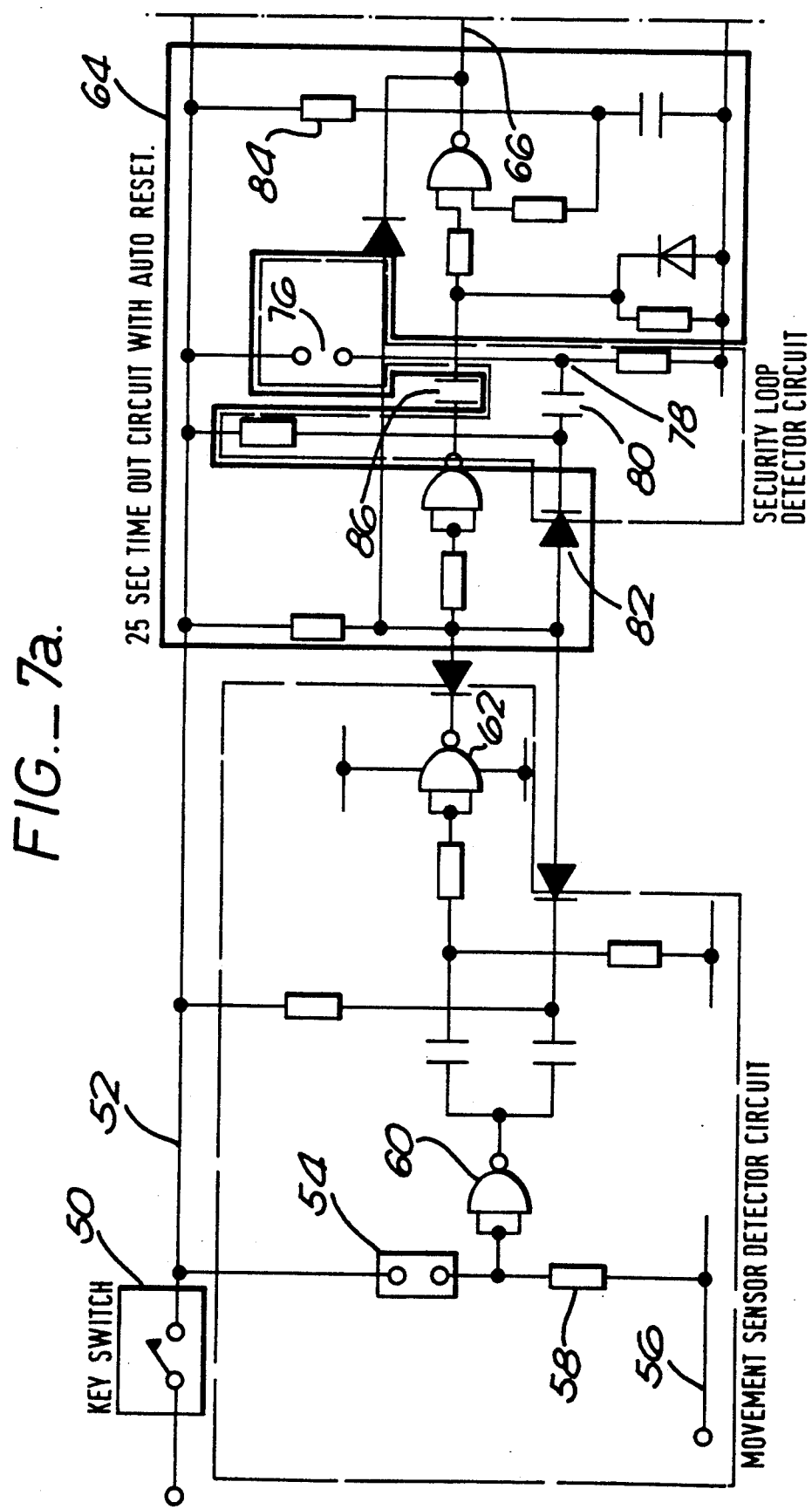
FIG.—7a.

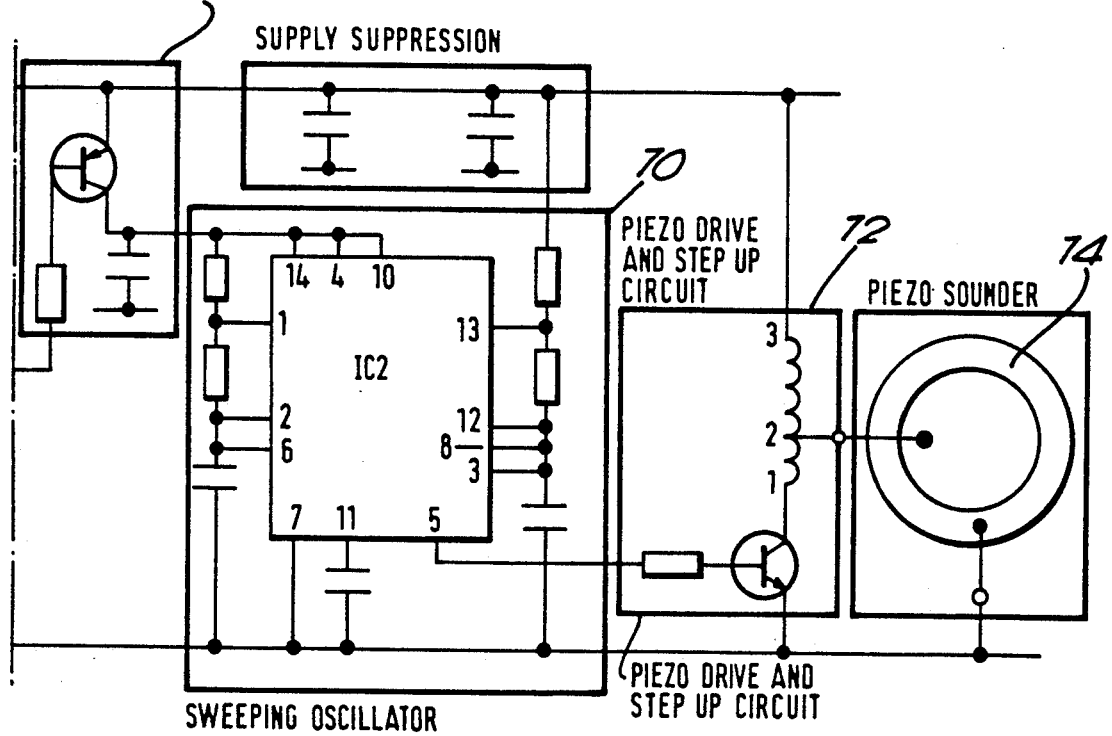

BICYCLE ALARM

This invention relates to portable locking devices, and particularly to locking devices which are suitable for attachment to bicycles or other mobile articles, and which are adapted to sound an alarm if the article is tampered with.

Various kinds of "shackle" or "padlock" type devices have previously been proposed for securing movable articles to fixed objects, and in order to make such devices more adaptable, they are commonly provided with flexible cables which can be threaded through a part of the article to be secured, and then fixed to the main body of the lock, the arrangement being such that the alarm is triggered, if the cable is cut or otherwise disconnected, whilst the device is armed.

Conventional devices of this kind suffer from a number of disadvantages, in particular the disadvantage that the flexible loop or cable is often too short to completely secure the article, and in addition, it is difficult to design the lock in such a way as to avoid the possibility of a would-be thief removing the battery, so as to totally deactivate the device.

Some possible solutions to this problem are proposed in the design of bicycle lock shown in GB 2,128,790B, which illustrates a device which is adapted to be attached to a part of a bicycle (for example the frame) handlebars) and which contains a flexible conductive cable 14 which is wound onto a spool 6. In use, the required length of cable is pulled out of the device, threaded around the object to be secured, and the end of the cable then plugged back into the body of the device before arming the alarm, so that subsequent removal or cutting of the cable will trigger the alarm.

However, this device still suffers from the weakness that if the would-be thief can remove the cover from the casing of the alarm, he can then extract the battery, and thus deactivate the device.

The present invention therefore provides an alarm lock comprising a body containing alarm circuitry, a battery compartment, and a security cable forming part of an alarm circuit so that it can be attached to an article to secure it against tampering or theft as described above, and further comprising a releasable bracket or strap for attachment around an elongate part of the article to be secured, and the battery compartment being so arranged in the body of the device, that the opening for insertion or removal of the battery is obstructed by the or a part of the article in use. Preferably the security cable is stored on a spool and may be manually unwound to allow connection around the article.

Preferably the bracket comprises a flexible strap of tough elastomeric material having a free end which is adapted to clip onto the body of the alarm after being attached around the article and the other end is anchored inside the body be means of an adjustable clamping device which can be operated to draw the alarm onto the article. The clamping device may be operated by a screw mechanism which is adapted to be actuated by a special tool.

Preferably the alarm lock also contains a "trembler" type of motion sensor so that the alarm is triggered if an unauthorised user attempts to move the article when the alarm circuit is armed.

Preferably, the flexible cable contains a conductive wire or core, and the alarm circuitry is adapted to detect an interruption of the circuit caused by cutting or disconnecting the cable. The security cable may be mounted on a spring-loaded spool equipped with a tension detection device which is also adapted to trigger the alarm, if an attempt is made to pull more cable out of, or wind cable back into the storage spool, in an effort to release the secured article.

One embodiment of the invention will now be described by way of example, with reference to the accompanying drawings in which:

FIG. 1 is an elongate cross-section of the device of the invention, taken along the line I—I of FIG. 3;

FIG. 2 is an elongate cross-section taken in a plane at right angles to that of FIG. 1, corresponding to the view on the line II—II of FIG. 6;

FIG. 3 is a planar cross-section, taken parallel to the cross-section of FIG. 2, but offset to one side thereof;

FIG. 4 is a cross-section taken on the same plane of FIG. 3, as FIG. 1, but seen from the other side;

FIG. 5 is a cross-section taken on the line V—V of FIG. 2;

FIG. 6 is a cross-section taken on the line VI—VI of FIG. 3; and

FIGS. 7a and 7b are circuit diagrams of an alarm driver circuit.

Referring to the drawings, the preferred embodiment of the invention comprises a casing 2 containing a spool mechanism 4, carrying a conductive flexible cable 6. The inner end of the cable is connected to a contact 8 at the centre of the spool 4, which is in turn connected to an alarm circuit board 10, inside the casing, which is powered by a battery 12 contained in a separate compartment 14. A loud siren 32 is connected to the circuit board 10 and is driven in a known fashion to produce an alarm signal when the alarm is triggered.

The outer end of the cable 6 passes through an aperture 16 in the casing of the device, and is terminated by a jack plug 18, so that the cable can be pulled out of the device, threaded around the article to be secured and a suitable fixed object, and then inserted into a jack socket 20 on one side of the device, so as to complete the alarm circuit. A key switch 22 is provided so that the alarm can be armed, by turning the key switch, once the plug 18 has been inserted in the socket 20. At the same time a "trembler" or motion sensing circuit (FIG. 7) is also armed so that the alarm will be triggered if the secured article is moved.

When the device is used to secure a bicycle, it is attached to a part of the tubular frame of the bicycle, by means of a bracket or strap 24, one end 26 of which is anchored inside the casing 2 as explained below, and the other end 28 being formed with a detent portion 30 which is adapted to clip into a recess 32, on the other side of the body. The inner end 26 of the strap 24 is formed with a housing 34 containing a captive nut (not shown) through which the shank of a bolt 36 is threaded. The head 38 of the bolt is located in an inner compartment 40 of the body having an opening 42 which is normally closed by a cap 44. A screwdriver (not shown) having a specially shaped bit is provided with the alarm, to cooperated with a mating formation on the head of the bolt, which may, for example, be a triangular recess. In this way the bolt can be rotated to clamp the strap 24 tightly around the article to be secured, by pulling the end 26 into the body, and thus at the same time, tightly engaging the re-entrant portion of detent 30 of the other end of the strap in the recess 32.

As can be appreciated from the drawings, and in particular from a comparison of the position of the battery shown in FIG. 2, and the arrangement of the retaining bracket 24 in FIGS. 2 and 5, the device is particularly secure against unauthorised disarming by removal of the battery, because the open end 30 of the battery compartment is covered by the frame of the bicycle, when the device is attached to it by means of the strap 24. Consequently, the casing 2 can be made from two very rigidly connected shells, which do not have to be disassembled to replace the battery, since it is only necessary for the authorised user to disarm the device using the alarm key, to loosen the strap 24, and detach the device from the protected article, to obtain access to the battery compartment. Without the key and the special screwdriver required for the strap, however, it is very difficult for a would-be thief to obtain sufficient access to disconnect or remove the battery, without setting off the alarm siren.

FIG. 7 is a circuit diagram of a suitable form of electrical circuit for the alarm system. A key switch contact 50 of the key switch 22, FIG. 2, arms the circuit by connecting the power supply rail 52 to the positive side of the battery. A mercury tilt switch 54 is connected between the positive power supply rail and the negative tail 56, in series with a 1M resistor 58, which acts as a motion detector so that when the contacts of the mercury switch are closed, the voltage across the resistor rises and the rising output is applied via inverting gates 60 and 62 acting as buffers, to one input of a 25-second time-out circuit 64 comprising a 1M resistor (84) and a 10uF capacitor (86). The circuit 64 is arranged to reset its own input 25 seconds after it is initially triggered, and its output is applied to a driver transistor 68 which in turn drives a sweep oscillator circuit 70. The output of the sweep oscillator circuit is applied to an output driver circuit 72 including a 2N3704 power transistor having an autotransformer in its collector circuit, so as to provide a high drive voltage to a piezo-electric sounder 74.

The security loop 6 (FIG. 2) is also connected in the circuit at 76 in series with a 100 k resistor so that when the loop is properly connected, the voltage at 78 across the resistor is equal to the power supply voltage, but if the loop is cut or otherwise disconnected the voltage will fall, providing a falling voltage pulse as an alternative alarm signal input to the time-out circuit 64 via the coupling capacitor 80 and blocking diode 82.

We claim:

1. An alarm lock comprising:
   a casing;
   said casing containing: an alarm circuit a siren connected to said alarm circuit and a battery compartment;
   means for arming said alarm circuit;
   a security cable connected to said alarm circuit one end of said cable being secured to said casing;
   releasable connector means on the other end of said cable; and
   co-operating connector means on said casing, whereby said siren is triggered by unauthorised removal of said connector or unauthorised disconnection or breaking of said cable;
   a releasable strap for attachment of said casing to a part of an article to be secured;
   and an access opening in said casing for said battery compartment, said access opening being so arranged as to be obstructed by said article, when said casing is attached there; one end of said strap comprising threaded adjustment means, the casing carrying cooperating means whereby the position of the strap, relative to the casing, may be adjusted, and the other end of said strap carrying hook means, the casing incorporating an aperture on its external surface adapted to receive said hook whereby the alarm lock can be attached to said article by passing said strap around said article, engaging said hook in said aperture, and tightening said adjustment means.

2. An alarm lock according to claim 1 further comprising:
   a spool in said casing for storage of said security cable, and adapted to be manually rotated to enable said cable to be extended from said casing so as to be connected around the article to be secured.

3. An alarm lock according to claim 2 further comprising:
   an adjustable clamping screw rotatably mounted in said casing;
   and a co-operating captive nut mounted on said one end of said strap; whereby said strap may be tightened onto said article after securing said clip, by rotating said clamping screw.

4. An alarm lock according to claim 3 in which said clamping screw is recessed in said casing, and comprises a head having a male or female formation which is adapted to cooperate with a tool having a correspondingly female or male formation.

5. An alarm lock according to claim 1 further comprising:
   a motion sensitive device in said casing, and adapted to trigger said siren upon unauthorised movement of said article.

6. An alarm lock according to claim 1 wherein said means for arming said alarm circuit comprises a key switch.

7. An alarm lock according to claim 1 in which said alarm circuit comprises:
   a power supply having positive and negative supply rails;
   resistor means connected to one of said supply rails;
   connection means for connecting said security cable between said resistor means, and the other said supply rail;
   detector means connected to the junction between said connection means, and said resistor means so as to detect a change of voltage; and
   a drive circuit for said siren connected between said detector means and said siren so as to sound said siren when said security cable is broken or disconnected.

8. An alarm lock according to claim 5 in which said alarm circuit comprises:
   a power supply having positive and negative supply rails;
   resistor means connected to one of said supply rails;
   said motion sensitive device being connected between said resistor means and the other said supply rail,
   detector means connected to the junction between said motion sensitive device and said resistor means so as to detect a change of voltage; and
   a drive circuit for said siren connected between said detector means and said siren so as to sound said siren when said motion sensitive device is activated by movement of said article.

9. An alarm lock according to claim 1 further comprising: timer means arranged to reset said siren alarm circuit, after the siren has been sounded for a predetermined period.

* * * * *